(12) United States Patent
Baumgardt et al.

(10) Patent No.: US 8,794,571 B2
(45) Date of Patent: Aug. 5, 2014

(54) COOLER FOR AN AIRCRAFT COOLING SYSTEM, AIRCRAFT COOLING SYSTEM AND METHOD FOR OPERATING AN AIRCRAFT COOLING SYSTEM

(75) Inventors: Torben Baumgardt, Stade (DE); Ralf-Henning Stolte, Hamburg (DE); Carsten Weber, Bremen (DE); Remy Reynaud, Bremen (DE); Christian Mueller, Hamburg (DE)

(73) Assignee: Airbus Operations GmbH (DE)

( * ) Notice: Subject to any disclaimer, the term of this patent is extended or adjusted under 35 U.S.C. 154(b) by 404 days.

(21) Appl. No.: 13/256,828

(22) PCT Filed: Mar. 5, 2010

(86) PCT No.: PCT/EP2010/001391
§ 371 (c)(1),
(2), (4) Date: Mar. 19, 2012

(87) PCT Pub. No.: WO2010/105744
PCT Pub. Date: Sep. 23, 2010

(65) Prior Publication Data
US 2012/0160445 A1 Jun. 28, 2012

Related U.S. Application Data

(60) Provisional application No. 61/160,431, filed on Mar. 16, 2009.

(30) Foreign Application Priority Data

Mar. 16, 2009 (DE) .................. 10 2009 013 159

(51) Int. Cl.
*B64C 1/38* (2006.01)

(52) U.S. Cl.
USPC ............ 244/130; 165/96; 165/99; 244/57; 244/53 B

(58) Field of Classification Search
USPC ............ 244/57, 58, 53 B, 130; 60/39.091, 60/39.092; 55/306; 137/15.1, 15.2; 165/97, 96, 99
See application file for complete search history.

(56) References Cited

U.S. PATENT DOCUMENTS 2,268,183 A * 12/1941 Bugatti .................... 244/57
2,274,442 A *  2/1942 Woods ................... 123/41.33

(Continued)

FOREIGN PATENT DOCUMENTS

| AT | 10 4447 B | 10/1926 |
| CN | 1484599 A |  3/2004 |

(Continued)

OTHER PUBLICATIONS

English Translation of First Notification of Office Action of counterpart Chinese Patent Application No. 201080018462.6 issued by The State Intellectual Property Office of P.R. China on Sep. 24, 2013.

(Continued)

*Primary Examiner* — Philip J Bonzell
(74) *Attorney, Agent, or Firm* — Barnes & Thornburg LLP

(57) ABSTRACT

This disclosure relates to a cooler for an aircraft cooling system. The cooler includes a matrix body in which a plurality of coolant channels are designed and extend from a first surface of the matrix body to a second surface of the matrix body, allowing a coolant to flow through the matrix body. The matrix body of the cooler is designed to form a section of the outer skin of the aircraft.

26 Claims, 7 Drawing Sheets

(56) References Cited

U.S. PATENT DOCUMENTS

| | | | |
|---|---|---|---|
| 2,330,632 A * | 9/1943 | Seligman | 165/86 |
| 2,340,396 A * | 2/1944 | McDonnell, Jr. | 244/57 |
| 3,089,318 A | 5/1963 | Hebeler | |
| 4,180,290 A | 12/1979 | Drews | |
| 4,203,566 A | 5/1980 | Lord | |
| 4,739,823 A | 4/1988 | Howard | |
| 4,830,312 A | 5/1989 | Hain et al. | |
| 5,865,398 A * | 2/1999 | Pashea et al. | 244/53 B |
| 6,092,360 A * | 7/2000 | Hoag et al. | 60/783 |
| 6,651,929 B2 * | 11/2003 | Dionne | 244/57 |
| 6,942,181 B2 * | 9/2005 | Dionne | 244/57 |
| 7,069,731 B2 | 7/2006 | Hunt | |
| 7,364,117 B2 * | 4/2008 | Dionne | 244/58 |
| 8,444,083 B2 * | 5/2013 | Light et al. | 244/53 B |
| 8,608,106 B2 * | 12/2013 | Baumgardt et al. | 244/53 B |
| 2003/0080244 A1 * | 5/2003 | Dionne | 244/57 |
| 2004/0060278 A1 * | 4/2004 | Dionne | 60/39.83 |
| 2007/0063098 A1 * | 3/2007 | Dionne | 244/57 |
| 2011/0017426 A1 * | 1/2011 | Baumgardt et al. | 165/59 |
| 2012/0237332 A1 * | 9/2012 | Bulin et al. | 415/1 |

FOREIGN PATENT DOCUMENTS

| | | |
|---|---|---|
| DE | 301680 A | 11/1919 |
| DE | 350142 A | 3/1922 |
| DE | 654694 A | 12/1937 |
| DE | 733564 A1 | 3/1943 |
| DE | 3609541 A1 | 9/1987 |
| DE | 3709924 A1 | 10/1988 |
| DE | 102006020508 A1 | 10/2007 |
| DE | 60219939 T2 | 1/2008 |
| EP | 1840493 A2 | 10/2007 |
| GB | 228 110 A | 3/1926 |
| SU | 655595 A1 | 10/1979 |
| WO | 03/007715 A1 | 5/2003 |

OTHER PUBLICATIONS

PCT International Search Report and Written Opinion for PCT/EP2010/001391 completed by the EP Searching Authority on Jan. 17, 2011 (German text).

Decision on Granting a Patent for Invention for Application No. 2011139021/11(058304) completed by the Federal Service for Intellectual Property, Patents and Trademarks (ROSPATENT) on Feb. 12, 2013 (English Translation).

* cited by examiner

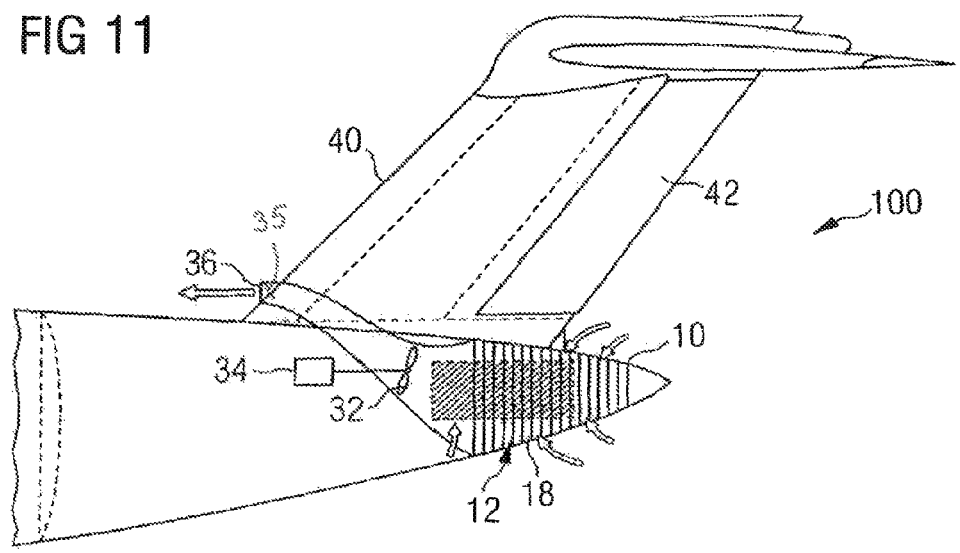
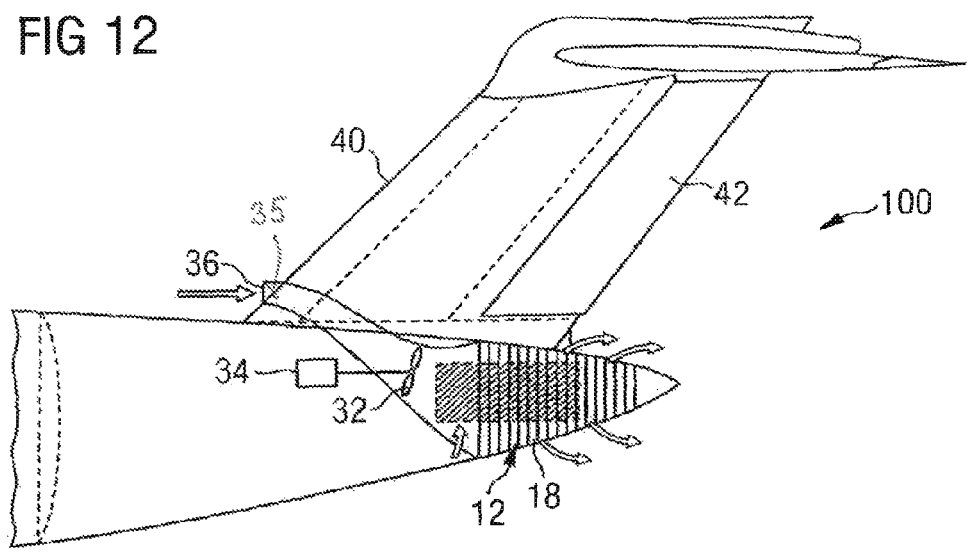

COOLER FOR AN AIRCRAFT COOLING SYSTEM, AIRCRAFT COOLING SYSTEM AND METHOD FOR OPERATING AN AIRCRAFT COOLING SYSTEM

CROSS-REFERENCE TO RELATED APPLICATIONS

This application is the U.S. national phase of PCT/EP2010/001391 filed Mar. 5, 2010. PCT/EP2010/001391 claims the benefit under the Convention of German Patent Application No. 10 2009 013 159.0 and U.S. Provisional Patent Application No. 61/160,431 both filed on Mar. 16, 2009.

FIELD OF THE INVENTION

The invention relates to a cooler for an aircraft cooling system, to an aircraft cooling system equipped with such a cooler and suitable, for example, for cooling a fuel cell system used on board an aircraft, and to a method for operating such an aircraft cooling system.

BACKGROUND

Fuel cell systems enable low-emission, highly efficient generation of electric current. For this reason, efforts are currently being made to use fuel cell systems to generate electrical energy in various mobile applications, such as for example in automotive engineering or aeronautics. It is, for example, conceivable in an aircraft to replace the generators, which are currently used to supply power on board and are driven by the main engines or the auxiliary power unit (APU), with a fuel cell system. A fuel cell system, moreover, might also be used to supply the aircraft with emergency power and replace the ram air turbine (RAT) hitherto used as an emergency power system.

Besides electrical energy, a fuel cell during operation generates thermal energy, which has to be removed from the fuel cell with the aid of a cooling system in order to prevent overheating of the fuel cell. A fuel cell system installed in an aircraft, for example for the on-board power supply, therefore has to be designed in such a way that it is capable of meeting a high demand for electrical energy. A fuel cell that has a high capacity for generating electrical energy, however, also generates a large amount of thermal energy and therefore has a high cooling requirement. Moreover, on board an aircraft a large number of further technical devices are provided, which generate heat and have to be cooled in order to guarantee reliable operation. These technical devices include, for example, the air conditioning units or the electronic control components of the aircraft.

Currently employed aircraft cooling systems normally comprise air inlet openings provided in the region of the aircraft outer skin which can be configured, for example, as ram air inlets and serve to convey ambient air as coolant into the aircraft cooling system. Cooling air warmed by absorbing heat from devices to be cooled on board the aircraft is usually led back into the environment through air outlet openings likewise provided in the region of the aircraft outer skin. The air inlet and air outlet openings formed in the aircraft outer skin, however, increase the aerodynamic drag and thus the fuel consumption of the aircraft. Moreover, aircraft cooling systems supplied with cooling air via ram air inlets have high pressure losses, a cooling capacity limited inter alia by the maximum supply air volume flow through the ram air inlets, and a relatively high weight.

SUMMARY

The object on which the present invention is based is to provide a compact cooler which is suitable for use in an aircraft cooling system and enables lightweight design and energy-efficient operation of an aircraft cooling system also provided for removing large heat loads from a heat-generating device, for example a fuel cell system, on board an aircraft. Furthermore, the object on which the invention is based is to specify an aircraft cooling system equipped with such a cooler and a method for operating such an aircraft cooling system.

This object is achieved by a cooler for an aircraft cooling system having the features of claim 1, an aircraft cooling system having the features of claim 9 and a method for operating an aircraft cooling system having the features of claim 21.

A cooler according to the invention, which is suitable for use in an aircraft cooling system, comprises a matrix body in which a plurality of coolant channels are formed and extend from a first surface of the matrix body to a second surface of the matrix body, allowing a coolant to flow through the matrix body. The first surface of the matrix body is preferably located opposite the second surface of the matrix body. For example, the first surface of the matrix body can form an outer surface of the matrix body, while the second surface of the matrix body can form an inner surface of the matrix body. The coolant channels can have any desired form. All that is essential is that they allow a coolant flow through the matrix body. In principle, the matrix body of the cooler according to the invention can be designed to allow any coolant to flow through it. Preferably, however, the cooler according to the invention is used in an aircraft cooling system in which air, preferably ambient air, is used as the coolant. The matrix body, and in particular the coolant channels formed in the matrix body, are therefore preferably designed so that air can flow without obstruction through the matrix body.

The matrix body of the cooler according to the invention can be provided merely with coolant channels through which a coolant can be supplied to a heat-generating device on board the aircraft for direct cooling. Alternatively to this, however, the cooler can also be configured in the form of a heat exchanger. Besides a plurality of coolant channels, a plurality of heat transfer medium channels can then also be formed in the matrix body and a heat transfer medium to be cooled can flow through them during the operation of the cooler. When coolant is led through the coolant channels, the cooling energy contained in the coolant can be transferred to the heat transfer medium to be cooled and the heat transfer medium can thereby be cooled. Finally, it is conceivable to use the cooler according to the invention both as a heat exchanger and for supplying coolant for direct cooling of a heat-generating device on board the aircraft. The coolant can then deliver cooling energy to a heat transfer medium as it flows through the matrix body and additionally be used, before or after flowing through the matrix body, for direct cooling of a heat-generating component or a heat-generating system on board the aircraft.

The matrix body of the cooler according to the invention is designed to form a section of an aircraft outer skin. In other words, the matrix body of the cooler according to the invention has a shape, size and structural properties which enable the matrix body to be used as an aircraft outer skin section. Furthermore, the matrix body of the cooler according to the invention is composed of a material which allows the use of the matrix body as an aircraft outer skin section. For example, the matrix body can be composed of a metal or a plastics material, in particular a fibre-reinforced plastics material.

The cooler according to the invention has the advantage that the matrix body replaces a structural part which is present on board the aircraft anyway, namely a section of the aircraft outer skin. The matrix body of the cooler thus does not require any or, depending on the thickness of the matrix body, only little additional installation space. Moreover, the cooler according to the invention causes relatively little additional weight. Finally, the cooler according to the invention allows a multiplication of the area through which coolant can flow, compared with conventional systems. As a result, the cooler delivers a very high cooling capacity and moreover cause only very low pressure losses. The cooler according to the invention can therefore be used particularly advantageously on board an aircraft for highly efficient removal of large heat loads from a heat-generating device, such as for example a fuel cell system.

Preferably, the matrix body of the cooler according to the invention comprises a plurality of lamellae delimiting the coolant channels formed in the matrix body. A coolant, in particular air, can flow through a matrix body provided with a lamellar structure without obstruction and with particularly low pressure losses. The lamellar structure formed in the matrix body can be adapted to the arrangement of the cooler according to the invention in the outer skin of the aircraft. For example, the lamellar structure can be shaped such that it enables an optimised flow through the matrix body in dependence on the air flow in the region of the cooler prevailing, for example, while the aircraft is flying. The lamellar structure of the matrix body can be realised by individual plate-like lamellae connected to one another. Alternatively to this, however, it is also conceivable to produce the matrix body from a foam-like material having the required through-flow properties.

The first surface of the matrix body is preferably designed to form, in the state of the cooler mounted in an aircraft, an outer surface of the aircraft outer skin and preferably has a structure which is suitable for reducing the frictional drag of the first matrix body surface when air is flowing over the first matrix body surface while the aircraft is flying. If the matrix body has a lamellar structure, the lamellae can form, for example in the region of the first matrix body surface, sharp-edged fine grooves which are oriented parallel to flow lines of the air flow flowing over the first matrix body surface while the aircraft is flying. Such a surface structure brings about a so-called "shark skin effect", i.e. it brings about a reduction of the frictional drag of the first matrix body surface. Consequently, the matrix body of the cooler according to the invention can be designed not only such that it does not result in an increased frictional drag and thus increased fuel consumption of the aircraft compared with a "smooth" aircraft outer skin, but can even be provided with surface properties which enable a frictional drag-reducing effect of the matrix body.

The matrix body of the cooler according to the invention can be of multilayer construction in the direction of the coolant flow through the coolant channels formed in the matrix body. For example, the matrix body can comprise an outer section adjoining the first matrix body surface, an inner section adjoining the second matrix body surface and a middle section arranged between the outer and the inner section. The different sections of the matrix body can, if desired or required, be provided with differently designed coolant channels and/or differently designed heat transfer medium channels, so that they have different through-flow properties. It is, however, also conceivable to construct the matrix body multilayered, i.e. with a plurality of sections through which a coolant and/or a heat transfer medium can flow, but to provide these sections with the same coolant channel structures and/or heat transfer medium channel structures. The matrix body then has the same through-flow properties in all sections, despite its multilayer construction.

The different sections of the matrix body can serve to supply various heat-generating devices on board the aircraft with cooling energy. Preferably, that section of the matrix body which is the first section through which the coolant flows during the operation of the cooler is assigned to a heat-generating device on board the aircraft which has a relatively high cooling power demand. By contrast, sections of the matrix body through which coolant flows during the operation of the cooler, after already being guided through other sections of the matrix body and in so doing having delivered cooling energy, are preferably assigned to heat-generating devices on board the aircraft which have a lower cooling power demand, i.e. can also be sufficiently cooled by coolant which has already delivered part of its cooling energy.

In principle, the cooler according to the invention can be designed such that its matrix body can form any desired section of the aircraft outer skin. All that is necessary for this is to provide the matrix body of the cooler according to the invention with the contours and radii of curvature required to adapt the matrix body to the fuselage geometry of the aircraft. Preferably, however, the matrix body of the cooler according to the invention is designed to form an aircraft outer skin section arranged in the region of a tail or a belly fairing of the aircraft. If the matrix body of the cooler is positioned in the region of the tail or the belly fairing of the aircraft, it is relatively well protected from external influences, such as for example bird strike, ice impact or damage caused by engine parts or other objects. Moreover, a cooler arranged in the region of the tail or the belly fairing of the aircraft can be used particularly advantageously to supply heat-generating components arranged in these regions of the aircraft with cooling energy, since in this case complex and heavy conduit systems can be at least largely dispensed with. Moreover, pressure conditions arise in the region of the tail and the belly fairing while the aircraft is flying which facilitate the flow through the coolant channels formed in the matrix body of the cooler.

In a preferred embodiment of the cooler according to the invention, the matrix body of the cooler can be designed to form an aircraft outer skin section adjacent to a tail end. For example, the matrix body can be shaped and dimensioned such that the entire aircraft outer skin section adjacent to the tail end is formed by the matrix body. The matrix body then preferably has the shape of a hollow truncated cone. If desired or required, however, the matrix body can also be shaped such that it is designed to form merely a partial region of the aircraft outer skin section adjacent to the tail end of the aircraft. Preferably, the matrix body has such a shape and size that it is suitable for forming a lower or an upper region of the aircraft outer skin section adjacent to the tail end. The matrix body can then have, for example, the shape of half a hollow truncated cone.

The cooler according to the invention can furthermore comprise a plurality of ribs extending from the first surface of the matrix body which is designed to form, in the state of the cooler mounted in an aircraft, an outer surface of the aircraft outer skin. The ribs are preferably designed to act as flow guiding plates, i.e. to guide an air flow, flowing over the first matrix body surface for example while the aircraft is flying, in a desired direction over the first matrix body surface. The arrangement of ribs on the first matrix body surface is particularly expedient when the cooler according to the invention, as will be explained in greater detail later, is to be operated at least in certain operating phases in a flow-around mode, in which the coolant is not guided through the coolant channels formed in the matrix body, but is led over the first matrix body surface. A further advantage of the configuration of the cooler according to the invention with a plurality of ribs extending from the first matrix body surface is that the ribs protect the matrix body and in particular the first matrix body surface from external influences.

In order to minimise the frictional drag caused by the ribs while the aircraft is flying and to enable a uniform flow over the first matrix body surface, the ribs are preferably oriented substantially parallel to flow lines of an air flow flowing over the first surface of the matrix body while the aircraft is flying. Furthermore, the ribs can have a contour curved in the direction of the first matrix body surface. The ribs extending from the first matrix body surface can be composed of the same material as the matrix body, but also from a different material. For example, the ribs can be produced from a metal or a plastics material, preferably a fibre-reinforced plastics material.

An aircraft cooling system according to the invention comprises at least one cooler described above. In principle, the cooling system according to the invention can be equipped with merely one cooler according to the invention, which can be arranged at a desired position of the aircraft fuselage. The aircraft cooling system according to the invention can, however, also be provided with a plurality of coolers according to the invention. For example, the aircraft cooling system can comprise at least one cooler arranged in the region of the tail of the aircraft and at least one cooler arranged in the region of the belly fairing of the aircraft. The aircraft cooling system according to the invention can be designed to supply a particular heat-generating component or a particular heat-generating system on board the aircraft with cooling energy. If desired, however, the aircraft cooling system according to the invention can also be designed so that it can serve as a central cooling system of the aircraft.

The aircraft cooling system according to the invention is equipped with a cooler which can be of lightweight design and takes up little if any installation space on board the aircraft. Furthermore, in the aircraft cooling system according to the invention, conduits and mounting components can be at least partly dispensed with. The aircraft cooling system can thus be designed overall to be lightweight and compact. Moreover, the cooling system according to the invention is distinguished by a high cooling capacity owing to the large through-flow area of the cooler. Furthermore, the low pressure losses on through-flow of the cooler enable particularly energy-efficient operation of the system. The coolers of the cooling system according to the invention have only a low susceptibility to fouling, particularly with a suitable arrangement for example in the region of the tail or the belly fairing of the aircraft, so that the system overall has low maintenance requirements. Moreover, the cooler of the cooling system according to the invention is easily accessible during mounting and when carrying out maintenance work.

The aircraft cooling system according to the invention preferably comprises a control unit which is designed to control the coolant flow through the coolant channels formed in the matrix body of the cooler, at least in certain operating phases of the cooling system, in such a way that the coolant in the region of the first surface of the matrix body, which surface in the state of the cooler mounted in an aircraft is designed to form an outer surface of the aircraft outer skin, passes into the coolant channels formed in the matrix body, and in the region of the second surface of the matrix body, which surface in the state of the cooler mounted in an aircraft is designed to form an inner surface of the aircraft outer skin, passes out of the coolant channels formed in the matrix body. In other words, the control unit controls the coolant flow through the coolant channels formed in the matrix body of the cooler in such a way that the coolant, preferably ambient air, is conveyed through the coolant channels formed in the matrix body of the cooler from the aircraft environment into an interior of an aircraft fuselage, i.e. the coolant flows through the matrix body of the cooler from the outside inwards.

As it flows through the coolant channels formed in the matrix body, the coolant can deliver its cooling energy to a heat transfer medium which likewise flows through heat transfer medium channels formed in the matrix body of the cooler. Alternatively or additionally to this, the coolant flowing through the coolant channels formed in the matrix body can also be used in the interior of the aircraft fuselage for direct cooling of a heat-generating component or a heat-generating system. For control of the coolant flow through the coolant channels formed in the matrix body of the cooler, the control unit can appropriately control, for example, the operation of a conveying device, such as for example a fan.

The aircraft cooling system according to the invention preferably furthermore comprises an opening connecting the interior of the aircraft fuselage to the aircraft environment and designed to act, in the operating phases of the cooling system in which the coolant flows through the matrix body of the cooler from the first matrix body surface in the direction of the second matrix body surface, as a coolant outlet, through which the coolant can be led back into the aircraft environment after flowing through the matrix body. The opening provided, for example, in the aircraft outer skin can have a variable flow cross-section and/or be closable, for example, by means of a flap. The control unit which serves to control the coolant flow through the coolant channels formed in the matrix body of the cooler, for example by appropriate control of a conveying device, can also be employed to control the variable flow cross-section of the opening and/or a position of a flap for closing the opening. If desired or required, however, a separate control unit can also be used to control the variable flow cross-section of the opening and/or the closing flap. If desired, the opening can be arranged in a region of the aircraft outer skin which enables the coolant flow to be used further for direct cooling of a heat-generating device on board the aircraft after flowing through the matrix body of the cooler and before being led back into the aircraft environment.

A particularly energy-efficient operation of the aircraft cooling system according to the invention is possible when the opening connecting the interior of the aircraft fuselage to the aircraft environment and acting as a coolant outlet is arranged in a region of the aircraft outer skin on which, while the aircraft is flying, a lower pressure acts than on the aircraft outer skin section formed by the matrix body of the cooler. In such a configuration of the aircraft cooling system according to the invention, pressure differences which are present anyway in the region of the aircraft outer skin while the aircraft is flying can be used to convey the coolant through the matrix body of the cooler and finally through the opening acting as a coolant outlet back into the aircraft environment. A conveying device, configured for example in the form of a fan or the like, of the aircraft cooling system can then be operated with lower power, at least in some operating phases of the aircraft cooling system. The conveying device can then be designed possibly to be less powerful and thus more compact and lighter. At least, however, it is not necessary to operate the conveying device always in the region of its maximum power, thereby increasing the service life of the conveying device and reducing its susceptibility to maintenance.

The opening connecting the interior of the aircraft fuselage to the aircraft environment and acting as a coolant outlet can be arranged in the region of a tail end of the aircraft, in the region of an edge, facing away from a tail of the aircraft, of an aircraft rudder unit and/or in the region of a belly fairing of the aircraft. Of course, the arrangement of the opening is preferably matched to the arrangement of the cooler in the fuselage of the aircraft. For example, the arrangement of the opening in the region of the tail end or of the edge, facing away from the tail of the aircraft, of the aircraft rudder unit is appropriate if the matrix body of the cooler is designed to form an aircraft outer skin section arranged in the region of the tail. An opening arranged in the region of the belly fairing of the aircraft is advantageous particularly in association with a cooler whose matrix body is designed to form an aircraft outer skin section located in the region of the belly fairing.

The aircraft cooling system according to the invention can furthermore comprise a control unit which is designed to control the coolant flow through the coolant channels formed in the matrix body of the cooler, at least in certain operating phases of the cooling system, in such a way that the coolant in the region of the second surface of the matrix body, which surface in the state of the cooler mounted in an aircraft is designed to form an inner surface of the aircraft outer skin, passes into the coolant channels formed in the matrix body, and in the region of the first surface of the matrix body, which surface in the state of the cooler mounted in an aircraft is designed to form an outer surface of the aircraft outer skin, passes out of the coolant channels formed in the matrix body. In other words, the control unit is designed to control the coolant flow in such a way that the coolant flows through the matrix body from the inside outwards, i.e. from the interior of the aircraft fuselage in the direction of the aircraft environment. For control of the coolant flow through the coolant channels formed in the matrix body of the cooler, the control unit can appropriately control, for example, the operation of a conveying device of the aircraft cooling system, such as for example a fan or the like.

In principle, the aircraft cooling system according to the invention can comprise a control unit which is only capable of controlling the coolant flow in one direction through the coolant channels formed in the matrix body of the cooler. Preferably, however, the aircraft cooling system according to the invention comprises a control unit which is capable of controlling the coolant flow, in different operating phases of the aircraft cooling system, in different directions through the coolant channels formed in the matrix body of the cooler. For example, the aircraft cooling system can then be operated in different operating modes while the aircraft is on the ground and while it is flying. For example, the control unit can control the coolant flow while the aircraft is on the ground in such a way that the coolant flows through the matrix body of the cooler from the outside inwards. By contrast, while the aircraft is flying, the control unit can control the coolant flow in such a way that the coolant flows through the matrix body of the cooler from the inside outwards. Alternatively to this, a flow through the matrix body from the inside outwards while the aircraft is on the ground and a flow through the matrix body from the outside inwards while the aircraft is flying can also be provided.

The aircraft cooling system according to the invention can furthermore comprise an opening connecting the interior of the aircraft fuselage to the aircraft environment and designed to act, in the operating phases of the aircraft cooling system in which the coolant flows through the matrix body of the cooler from the second matrix body surface in the direction of the first matrix body surface, as a coolant inlet, through which the coolant can be withdrawn from the aircraft environment before flowing through the matrix body. The opening provided, for example, in the aircraft outer skin can have a variable flow cross-section and/or be closable, for example, by means of a flap. The control unit which serves to control the coolant flow through the coolant channels formed in the matrix body of the cooler, for example by appropriate control of a conveying device, can also be employed to control the variable flow cross-section of the opening and/or a position of a flap for closing the opening. If desired or required, however, a separate control unit can also be used to control the variable flow cross-section of the opening and/or the closing flap. If desired, the opening can be arranged in a region of the aircraft outer skin which enables the coolant flow to be used for direct cooling of a heat-generating device on board the aircraft before flowing through the matrix body of the cooler. If desired, the opening connecting the interior of the aircraft fuselage to the aircraft environment and acting as a coolant inlet can be configured in the form of a surface-flush, frontally arranged scoop air inlet.

A particularly energy-efficient operation of the aircraft cooling system according to the invention is possible when the opening connecting the interior of the aircraft fuselage to the aircraft environment and acting as a coolant inlet is arranged in a region of the aircraft outer skin on which, while the aircraft is flying, a higher pressure acts than on the aircraft outer skin section formed by the matrix body of the cooler. In such a configuration of the aircraft cooling system according to the invention, pressure differences which are present anyway in the region of the aircraft outer skin while the aircraft is flying can be used to convey the coolant through the opening acting as a coolant inlet into the interior of the aircraft fuselage and subsequently through the matrix body of the cooler back into the aircraft environment. A conveying device, configured for example in the form of a fan or the like, of the aircraft cooling system can then be operated with lower power, at least in some operating phases of the aircraft cooling system. The conveying device can then be designed possibly to be less powerful and thus more compact and lighter. At least, however, it is not necessary to operate the conveying device always in the region of its maximum power, thereby increasing the service life of the conveying device and reducing its susceptibility to maintenance.

The opening connecting the interior of the aircraft fuselage to the aircraft environment and acting as a coolant inlet can be arranged in the region of a tail end of the aircraft, in the region of an edge, facing away from a tail of the aircraft, of an aircraft rudder unit and/or in the region of a belly fairing of the aircraft. Of course, the arrangement of the opening is preferably matched to the arrangement of the cooler in the fuselage of the aircraft. For example, the arrangement of the opening in the region of the tail end or of the edge, facing away from the tail of the aircraft, of the aircraft rudder unit is appropriate if the matrix body of the cooler is designed to form an aircraft outer skin section arranged in the region of the tail. An opening arranged in the region of the belly fairing of the aircraft is advantageous particularly in association with a cooler whose matrix body is designed for form an aircraft outer skin section located in the region of the belly fairing.

In principle, it is possible to provide the aircraft cooling system with a plurality of openings connecting the interior of the aircraft fuselage to the aircraft environment which can act either as only a coolant outlet or as only a coolant inlet. Preferably, however, to minimise the aerodynamic drag caused by the cooling system while the aircraft is flying, the aircraft cooling system has only one opening connecting the interior of the aircraft fuselage to the aircraft environment which acts as a coolant outlet or as a coolant inlet depending on the operating state of the aircraft cooling system.

The control unit of the aircraft cooling system according to the invention can furthermore be designed to control, by appropriate control of the position of a control element configured, for example, in the form of a flap and defining a flow cross-section of an opening connecting the interior of the aircraft fuselage to the aircraft environment, a coolant volume flow flowing through the opening. By controlling the coolant volume flow through the opening, it is possible to influence, for example, the cooling capacity delivered by the aircraft cooling system. Furthermore, the control unit can be designed to control, by appropriate control of the position of the flap controlling the flow cross-section of the opening, the aerodynamic drag caused by the flap while the aircraft is flying. For example, the control unit can move the flap into an appropriate opening position if it is desired to use the flap as an additional air brake.

The aircraft cooling system according to the invention preferably furthermore comprises a control unit which is designed to control the coolant flow in such a way that, at least in certain operating phases of the aircraft cooling system, the coolant flows over the first surface of the matrix body, which surface is designed to form in the state of the cooler mounted in an aircraft an outer surface of the aircraft outer skin. In other words, the control unit controls the coolant flow in such a way that substantially no flow through the coolant channels formed in the matrix body of the cooler takes place, but instead the coolant is led over the first surface of the matrix body. The control unit can be a separate control unit. Preferably, however, the aircraft cooling system according to the invention comprises a control unit which is capable of controlling the aircraft cooling system both in a flow-through mode, i.e. an operating state in which coolant flows through the matrix body of the cooler, and in flow-over mode, i.e. an operating state in which the coolant flows over the first surface of the matrix body.

In order to change the aircraft cooling system according to the invention into the flow-over mode, the control unit is preferably designed to close, in the operating phases of the aircraft cooling system in which the coolant flows over the first matrix body surface, an opening connecting the interior of the aircraft fuselage to the aircraft environment and acting as a coolant outlet or as a coolant inlet in operating phases of the aircraft cooling system in which the coolant flows through the matrix body of the cooler. In other words, the control unit moves, for example, a flap closing the opening, into its closed position.

Furthermore, the control unit can be designed to switch off, in the operating phases of the aircraft cooling system in which the coolant flows over the first matrix body surface, a conveying device which serves to convey, in operating phases of the aircraft cooling system in which the coolant flows through the matrix body of the cooler, coolant through the coolant channels formed in the matrix body of the cooler. In other words, in the flow-over mode of the aircraft cooling system according to the invention, the control unit switches off the conveying device for conveying coolant through the coolant channels formed in the matrix body of the cooler.

The effect achieved by closing the opening connecting the interior of the aircraft fuselage to the aircraft environment and by switching off the conveying device is that the coolant, at least predominantly, merely flows over the first matrix body surface and no longer passes into the coolant channels formed in the matrix body. Operation of the aircraft cooling system according to the invention in the flow-over mode is appropriate particularly while the aircraft is flying. By contrast, while the aircraft is on the ground, the aircraft cooling system is preferably operated in the flow-through mode. In the flow-over mode of the aircraft cooling system according to the invention, the flow of the coolant over the first matrix body surface is preferably controlled by a plurality of ribs which extend from the first matrix body surface and are preferably oriented substantially parallel to flow lines of the air flow flowing around the first matrix body surface while the aircraft is flying.

In a method according to the invention for operating an aircraft cooling system, at least in certain operating phases of the aircraft cooling system, a coolant flows through a matrix body of a cooler, in which a plurality of coolant channels are formed and extend from a first surface of the matrix body to a second surface of the matrix body, and which is designed to form a section of an aircraft outer skin.

The coolant flow through the coolant channels formed in the matrix body of the cooler can be controlled in such a way that, at least in certain operating phases of the aircraft cooling system, the coolant in the region of the first surface of the matrix body, which surface in the state of the cooler mounted in an aircraft is designed to form an outer surface of the aircraft outer skin, passes into the coolant channels formed in the matrix body, and in the region of the second surface of the matrix body, which surface in the state of the cooler mounted in an aircraft is designed to form an inner surface of the aircraft outer skin, passes out of the coolant channels formed in the matrix body. In other words, the coolant flow through the matrix body can be controlled in such a way that the coolant flows through the matrix body from the outside inwards.

Preferably, the coolant flow, after flowing through the matrix body of the cooler, is led back into the aircraft environment through an opening connecting an interior of the aircraft fuselage to the aircraft environment and acting as a coolant outlet.

Preferably, a lower pressure acts on the opening connecting the interior of the aircraft fuselage to the aircraft environment and acting as a coolant outlet, while the aircraft is flying, than on the aircraft outer skin section formed by the matrix body of the cooler.

The coolant flow through the coolant channels formed in the matrix body of the cooler can also be controlled in such a way that, at least in certain operating phases of the aircraft cooling system, the coolant in the region of the second surface of the matrix body, which surface in the state of the cooler mounted in an aircraft is designed to form an inner surface of the aircraft outer skin, passes into the coolant channels formed in the matrix body, and in the region of a first surface of the matrix body, which surface in the state of the cooler mounted in an aircraft is designed to form an outer surface of the aircraft outer skin, passes out of the coolant channels formed in the matrix body. In other words, the coolant flow can be controlled in such a way that the coolant flows through the matrix body from the inside outwards.

The coolant flow can be withdrawn from the aircraft environment, before flowing through the matrix body of the cooler, through an opening connecting an interior of an aircraft fuselage to the aircraft environment and acting as a coolant inlet.

By appropriate control of the position of a flap defining a flow cross-section of the opening connecting the interior of the aircraft fuselage to the aircraft environment and acting as a coolant inlet, a coolant volume flow flowing through the opening and/or an aerodynamic drag caused by the flap while the aircraft is flying can be controlled as desired.

At least in certain operating phases of the aircraft cooling system, the coolant can flow over the first surface of the matrix body, which surface is designed to form in the state of the cooler mounted in an aircraft an outer surface of the aircraft outer skin. In other words, in certain operating phases of the aircraft cooling system, the coolant is not guided through the coolant channels formed in the matrix body, but led over the first matrix body surface. Such a control of the coolant flow is appropriate particularly while the aircraft is flying.

In the operating phases of the aircraft cooling system in which the coolant flows over the first matrix body surface, preferably an opening connecting the interior of the aircraft fuselage to the aircraft environment and acting as a coolant outlet or as a coolant inlet in operating phases of the aircraft cooling system in which the coolant flows through the matrix body of the cooler is closed.

Furthermore, in operating phases of the aircraft cooling system in which the coolant flows over the first matrix body surface, preferably a conveying device which serves to convey, in operating phases of the aircraft cooling system in which the coolant flows through the matrix body of the cooler, coolant through the coolant channels formed in the matrix body of the cooler is switched off.

In the operating phases of the cooling system in which the coolant flows over the first matrix body surface, the coolant flow over the first matrix body surface is preferably controlled by a plurality of ribs extending from the first matrix body surface preferably parallel to flow lines of an air flow flowing around the first matrix body surface while the aircraft is flying.

BRIEF DESCRIPTION OF THE DRAWINGS

Preferred embodiments of the invention are now explained in more detail with reference to the appended schematic drawings, of which FIG. 11 shows a second embodiment of an aircraft cooling system operated in a first operating state, FIG. 12 shows the aircraft cooling system according to FIG. 11 operated in a second operating state.

DETAILED DESCRIPTION OF THE DRAWINGS

Figure 1:
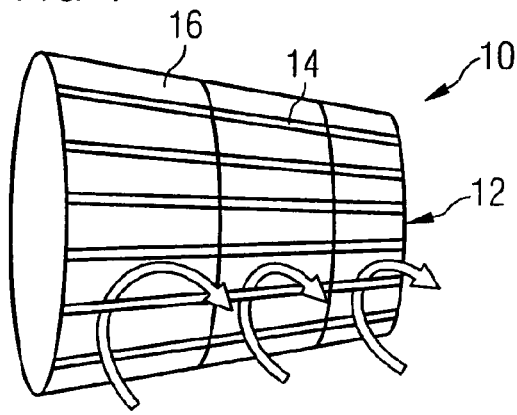
FIG. 1 shows an illustration of a first embodiment of a cooler suitable for use in an aircraft cooling system.
Figure 2:
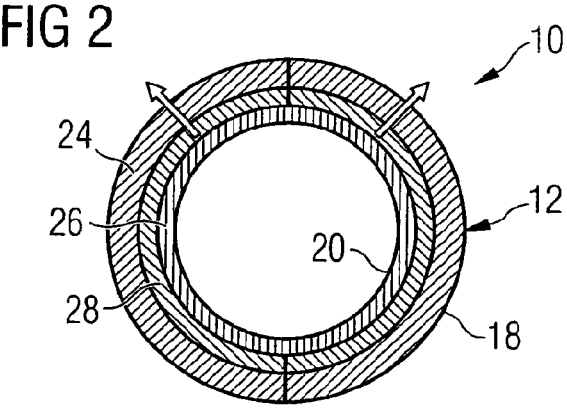
FIG. 2 shows a cross-sectional view of the cooler according to FIG. 1.
Figure 3:
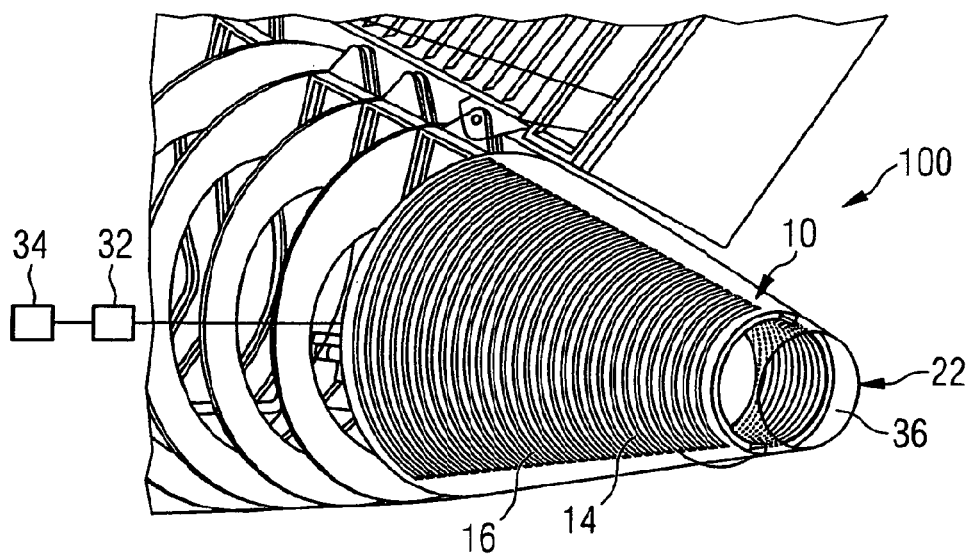
FIG. 3 shows the cooler according to FIG. 1 in the state mounted in an aircraft.

FIGS. 1 to 3 illustrate a first embodiment of a cooler 10 suitable for use in an aircraft cooling system 100 (see FIGS. 7 to 13 and 15). The cooler 10 shown in FIGS. 1 to 3 comprises a matrix body 12 comprising a plurality of lamellae 14, schematically illustrated in FIGS. 1 and 3. The lamellae 14 delimit a plurality of coolant channels 16 extending from a first surface 18 of the matrix body 12 to a second surface 20 of the matrix body 12 (see FIG. 2).

The matrix body 12 of the cooler 10 is configured in the shape of a hollow truncated cone and, as can be seen in particular in FIG. 3, is designed to form a region of an aircraft outer skin adjacent to a tail end 22 of an aircraft. In other words, the matrix body 12 of the cooler 10 replaces, in the region of the aircraft adjacent to the tail end 22, the aircraft outer skin present in the remaining regions of the aircraft. The first matrix body surface 18 thus forms, in the state of the cooler 10 mounted in an aircraft, an outer surface of the aircraft outer skin, whereas the second matrix body surface 20 forms, in the state of the cooler 10 mounted in an aircraft, an inner surface of the aircraft outer skin. The matrix body 12 of the cooler 10 is composed of a material, such as for example a metal or a plastics material, in particular a fibre-reinforced plastics material, whose mechanical properties are adapted to the requirements placed on an aircraft outer skin section. This ensures that the cooler 10 meets the structural requirements resulting from its positioning in the region of the aircraft outer skin.

The coolant channels 16 formed in the matrix body 12 allow air to flow through the matrix body 12. The air flowing through the coolant channels 16 formed in the matrix body 12 of the cooler 10 can be used in the aircraft cooling system 100 to supply a heat-generating device on board the aircraft with cooling energy. The air conveyed through the coolant channels 16 can be used directly or indirectly for cooling a heat-generating component or a heat-generating system on board the aircraft. For example, air supplied from the aircraft environment through the coolant channels 16 formed in the matrix body 12 of the cooler 10 into an interior of the aircraft fuselage can be used directly to flow around a heat-generating component arranged in the interior of the aircraft fuselage and in so doing deliver cooling energy to the heat-generating component. However, optimum utilisation of the cooling energy contained in the ambient air is possible when the matrix body 12, as illustrated in particular in FIG. 2, is configured in the form of a heat exchanger of multilayer construction.

It can be seen in FIG. 2 that the matrix body 12 of the cooler 10 comprises a first heat exchanger layer 24 adjacent to the first matrix body surface 18, a second heat exchanger layer 26 adjacent to the second matrix body surface 20 and a third heat exchanger layer 28 arranged between the first heat exchanger layer 24 and the second heat exchanger layer 26. The three heat exchanger layers 24, 26, 28 are each formed with heat transfer medium channels, through which flows a heat transfer medium to be cooled. The heat exchanger layers 24, 26, 28 are assigned to different heat-generating systems on board the aircraft, i.e. they serve to supply cooling energy to these heat-generating systems.

If cooling air flows through the matrix body 12 of the cooler 10, as indicated in FIG. 1, from the outside inwards, i.e. from the first matrix body surface 18 in the direction of the second matrix body surface 20, the cooling energy content of the cooling air decreases continuously as it flows through the matrix body 12 owing to cooling energy transfer to the first heat exchanger layer 24, the third heat exchanger layer 28 and finally the second heat exchanger layer 26. Optimal utilisation of the cooling energy contained in the cooling air is therefore ensured when the first heat exchanger layer 24 is used to cool a heat-generating system with a high cooling power demand. The third heat exchanger layer 28 and finally the second heat exchanger layer 26, by contrast, are expediently used to supply heat-generating systems with a lower cooling power demand with the cooling energy remaining in the cooling air after flowing through the first heat exchanger layer 24.

As will be explained in greater detail later, however, it is also conceivable to guide the cooling air through the matrix body 12 of the cooler from the inside outwards, i.e. from the second matrix body surface 20 in the direction of the first matrix body surface 18. In such a case, the second heat exchanger layer 26 is expediently used to cool a heat-generating system with a high cooling power demand. The third heat exchanger layer 28 and the first heat exchanger layer 24, by contrast, are then expediently used to supply heat-generating systems with a lower cooling power demand with the cooling energy remaining in the cooling air after flowing through the second heat exchanger layer 26.

Furthermore, the supply of cooling air into the different heat exchanger layers 24, 26, 28 can be controlled by shutters. If a heat-generating system assigned to a heat exchanger layer 24, 26, 28 has a high cooling power demand, a sufficient cooling air supply into this heat exchanger layer 24, 26, 28 can be ensured by appropriate control of the shutter positions. It is likewise possible, by appropriate control of the shutter positions, to reduce or even prevent the supply of cooling air into a heat exchanger layer 24, 26, 28 if a heat-generating system assigned to the heat exchanger layer 24, 26, 28 has only a low cooling power demand or none at all. This enables particularly effective and efficient utilisation of the available cooling air.

Of course, when the matrix body 12 is configured in the form of a heat exchanger, the cooling air flowing through the matrix body 12 can be used additionally for direct cooling of a heat-generating component arranged in the interior of the aircraft fuselage. For example, the cooling air can flow around the heat-generating component after flowing through the matrix body 12 or before flowing through the matrix body 12.

The first matrix body surface 18, which, in the state of the cooler 10 mounted in an aircraft, forms an outer surface of the aircraft outer skin, has a structure which is suitable for reducing the frictional drag of the first matrix body surface 18 when air is flowing around the first matrix body surface 18 while the aircraft is flying. For example, the lamellae 14 formed in the matrix body 12 can form, in the region of the first matrix body surface 18, sharp-edged fine ribs oriented substantially parallel to the air flow flowing over the first matrix body surface 18 while the aircraft is flying. Such a configuration of the first matrix body surface 18 ensures that the frictional drag of the aircraft is not increased by integrating the cooling 10 into the aircraft outer skin, but can be even be reduced. This makes it possible to achieve fuel savings.

Figure 4:
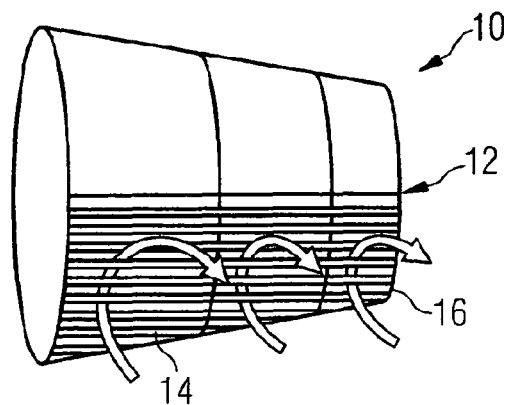
FIG. 4 shows an illustration of a second embodiment of a cooler suitable for use in an aircraft cooling system.
Figure 5:
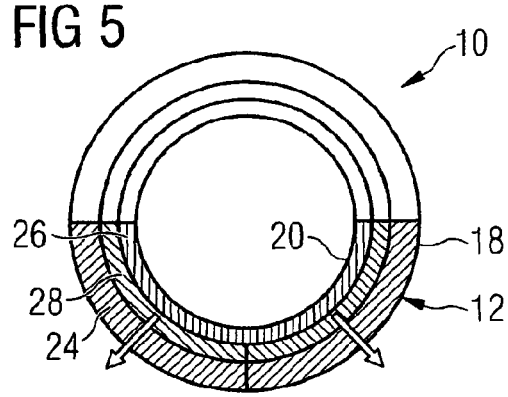
FIG. 5 shows a cross-sectional view of the cooler according to FIG. 4.

FIGS. 4 and 5 show a second embodiment of a cooler 10, which differs from the cooler 10 illustrated in FIGS. 1 to 3 in that it merely takes the shape of half a hollow truncated cone. The matrix body 12 of the cooler 10 shown in FIGS. 4 and 5 is designed in particular to form a lower region of an aircraft outer skin section adjacent to a tail end 22 of the aircraft. Otherwise, the construction and functioning of the cooler 10 illustrated in FIGS. 4 and 5 corresponds to the construction and functioning of the cooler 10 shown in FIGS. 1 to 3.

Figure 6:
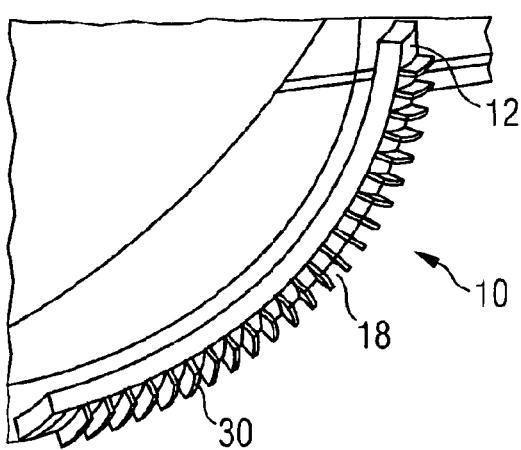
FIG. 6 shows a cross-sectional view of a third embodiment of a cooler suitable for use in an aircraft cooling system.

FIG. 6 illustrates a third embodiment of a cooler 10 suitable for use in an aircraft cooling system 100. The cooler 10 according to FIG. 6 is distinguished in that a plurality of ribs 30 extend from the first surface 18 of the matrix body 12. As will be explained in greater detail later, the ribs 30 act as flow guiding plates and are oriented substantially parallel to flow lines of an air flow flowing around the first matrix body surface 18 while the aircraft is flying. Furthermore, the ribs 30 have a contour curved in the direction of the first matrix body surface 18 (see, in this regard, also FIGS. 14 and 16). The ribs 30 allow an air flow, flowing through the first matrix body surface 18 while the aircraft is flying, to be controlled as desired. Moreover, the ribs 30 protect the matrix body 12, and in particular the first matrix body surface 18, from external influences, such as for example bird strike, ice impact, etc.

All the coolers 10 shown in FIGS. 1 to 6 may, if required, have sections not allowing air to flow through, i.e. for example may have no lamellar structure or be provided with a cover. These sections may be provided, for example, in regions of the coolers 10 which are subjected to high mechanical loads or owing to their position are especially at risk of external influences, particularly while the aircraft is flying.

Figure 7:
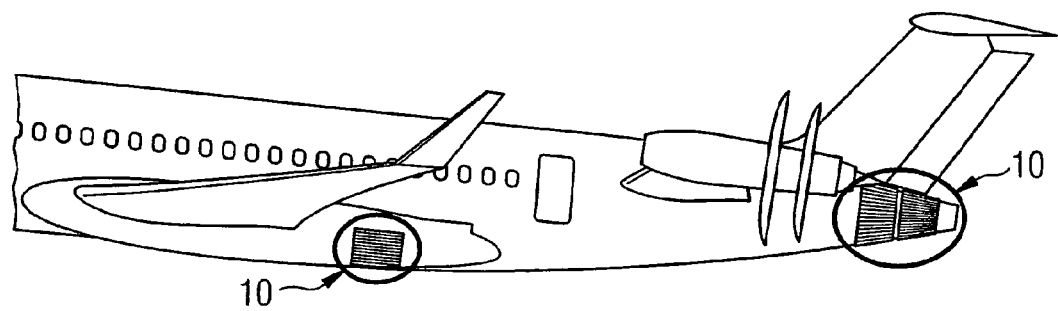
FIG. 7 shows a side view of an aircraft equipped with an aircraft cooling system having a plurality of coolers.
Figure 8:
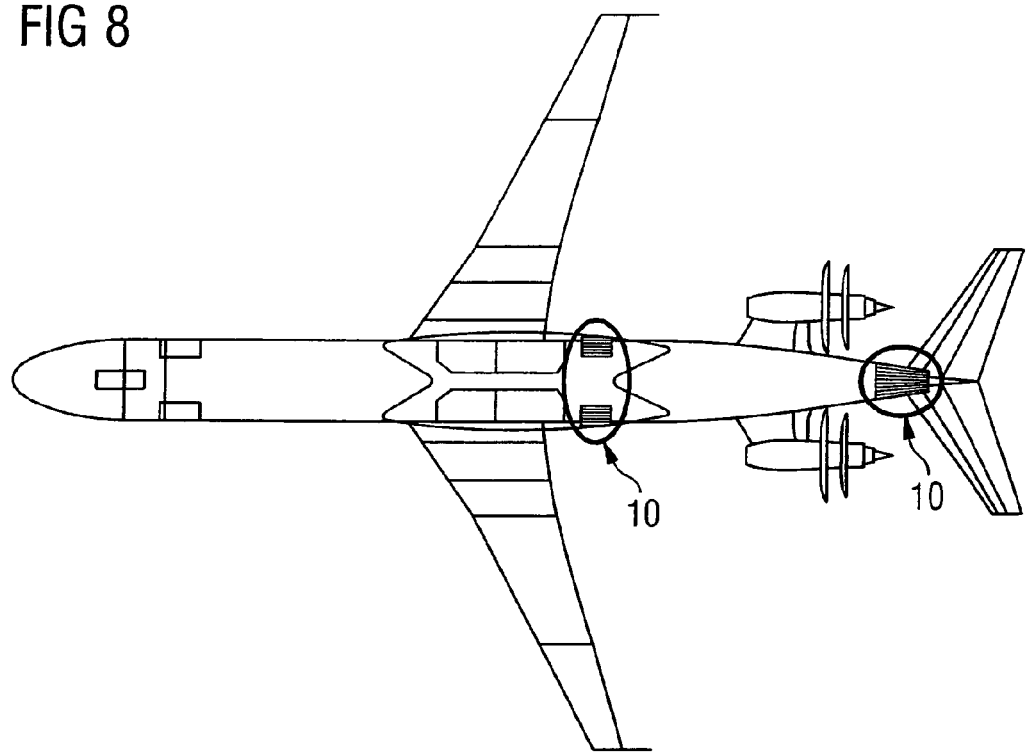
FIG. 8 shows a view of the underside of the fuselage of the aircraft according to FIG. 7.

FIGS. 7 and 8 illustrated preferred positions, in which coolers 10 of an aircraft cooling system 100 can be arranged in the region of an aircraft outer skin. For example, one or more coolers 10 can be positioned in the region of a tail of the aircraft, for example adjacent to the tail end 22 of the aircraft. It is also conceivable to arrange one or more coolers 10 in the region of the belly fairing of the aircraft. Finally, one or more coolers 10 can also be positioned in the region of the wings of the aircraft. Such a cooler arrangement enables tangential blowing out of air. The aircraft cooling system 100 can comprise merely one cooler 10, but also a plurality of coolers 10, as required. In principle, the coolers 10 can be arranged in any regions of the aircraft. Preferably, however, the coolers 10 replace sections of the aircraft outer skin which are relatively well protected from external influences, such as for example bird strike, ice impact or, in the event of engine defects, from engine components detached from the engine. Against this background, the arrangement of the coolers 10 in the region of the aircraft tail or in the region of the belly fairing of the aircraft is advantageous.

Figure 9:
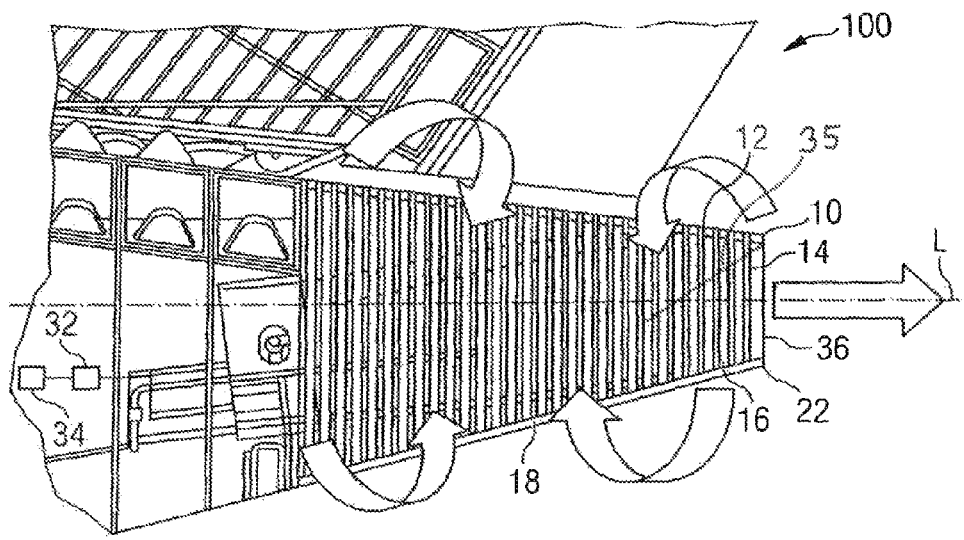
FIG. 9 shows a first embodiment of an aircraft cooling system operated in a first operating state.
Figure 10:
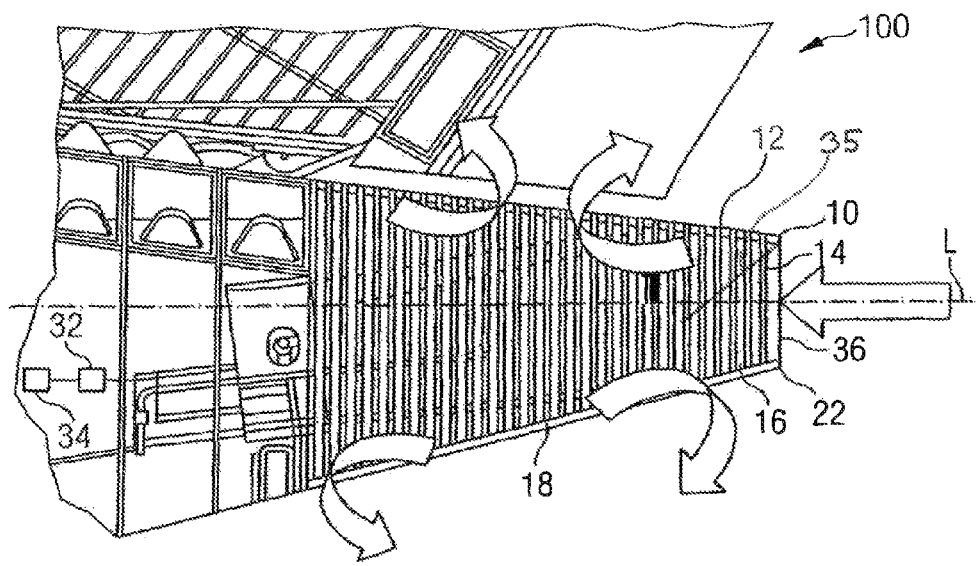
FIG. 10 shows the aircraft cooling system according to FIG. 9 operated in a second operating state.

FIGS. 9 and 10 illustrate an aircraft cooling system 100 in different operating phases, the system being equipped with a cooler 10 in the shape of a hollow truncated cone and arranged adjacent to a tail end 22 of the aircraft, as illustrated in FIGS. 1 to 3. Of course, the aircraft cooling system 100 could also be equipped with a cooler 10 configured in the shape of half a hollow truncated cone, as shown in FIGS. 4 and 5, instead of with a cooler 10 illustrated in FIGS. 1 to 3. The cooling system 100 comprises, besides the cooler 10, a conveying device 32 configured in the form of a fan. The conveying device 32 can be arranged, for example, in a region of the aircraft fuselage adjacent to the tail end 22. The operation of the conveying device 32 is controlled by an electronic control unit 34.

In the operating state of the aircraft cooling system 100 illustrated in FIG. 9, the electronic control unit 34 controls the conveying device 32 in such a way that air is conveyed from the aircraft environment through the coolant channels 16 formed in the matrix body 12 of the cooler 10 from the first matrix body surface 18 in the direction of the second matrix body surface 20, i.e. from the outside inwards through the coolant channels 16 formed in the matrix body 12. As it flows through the coolant channels 16, the ambient air delivers cooling energy. After flowing through the matrix body 12 of the cooler 10, the cooling air guided through the matrix body 12 of the cooler 10 into an interior of the aircraft fuselage can further be used for direct cooling of a heat-generating component arranged in the interior of the aircraft fuselage. Finally, the air is led through an opening 36 provided in the region of the tail end 22 back into the aircraft environment. The opening 36 thus acts as a coolant outlet. The opening 36 has a flow cross-section variable by means of a flap 35. The position of the flap defining the flow cross-section of the opening 36 is controlled by the electronic control unit 34, just as the conveying device 32.

An air discharge through an opening 36 arranged in the region of the aircraft tail end 22 causes only a relatively low additional aerodynamic drag while the aircraft is flying. If desired or required, the tail end region of the aircraft fuselage can also be oriented not, as shown in FIGS. 9 and 10, substantially perpendicular to a longitudinal axis L of the aircraft, but at an angle relative to the longitudinal axis L of the aircraft. As a result, the maximum flow cross-section of an opening 36 arranged in the region of the tail end 22 can be increased in a simple manner.

Furthermore, owing to the air supply into the interior of the aircraft fuselage through the coolant channels 16 formed in the matrix body 12 of the cooler 10 while the aircraft is flying, a boundary layer which forms above the first matrix body surface 18 while the aircraft is flying can be "sucked away". As a result, the formation of additional air vortices in the region of the first matrix body surface 18 can be avoided and consequently the aerodynamic properties of the aircraft improved. Moreover, owing to the air discharge through the opening 36 arranged in the region of the tail end 22, additional thrust can be generated and advantageously used while the aircraft is flying.

In the operating state of the aircraft cooling system 100 shown in FIG. 10, the conveying device 32 is controlled by the electronic control unit 34 in such a way that air is sucked from the aircraft environment through the opening 36 arranged in the region of the aircraft tail end 22 into the interior of the aircraft fuselage. In other words, the opening 36 provided in the region of the aircraft tail end 22 and opening into the interior of the aircraft fuselage is used as a coolant outlet in the operating state of the aircraft cooling system 100 illustrated in FIG. 9, while it serves as a coolant inlet in the operating state of the aircraft cooling system 100 shown in FIG. 10. The cooling air flow guided into the interior of the aircraft fuselage is used in the interior of the aircraft fuselage firstly for direct cooling of a heat-generating component. Subsequently, the cooling air is guided through the coolant channels 16 formed in the matrix body 12 of the cooler 10, the cooling air flowing through the matrix body 12 from the second matrix body surface 20 in the direction of the first matrix body surface 18, i.e. from the inside outwards. As it flows through the coolant channels 16 formed in the matrix body 12, the cooling air delivers cooling energy.

While the aircraft is flying, a higher pressure acts on the opening 36 arranged in the region of the aircraft tail end 22 than on the matrix body 12 of the cooler 10. The pressure difference which builds up while the aircraft is flying between the opening acting as an air inlet and the first matrix body surface 18 can thus be used advantageously to assist the cooling air conveyance through the opening and the matrix body 12.

As already explained in connection with FIG. 9, the flow cross-section of the opening 36, which is used as an air outlet in the operating state of the aircraft cooling system 100 shown in FIG. 9 and as an air inlet in the operating state of the aircraft cooling system 100 shown in FIG. 10, can be controlled by means of a flap 35. In the operating state of the aircraft cooling system 100 shown in FIG. 10, the cooling air mass flow conveyed into the interior of the aircraft fuselage and finally through the matrix body 12 of the cooler can be controlled as desired by appropriate control of the flap position by the electronic control unit 34, as well as by appropriate control of the conveying device 32.

If desired, the aircraft cooling system 100 can be operated in the operating state illustrated in FIG. 9 both while the aircraft is on the ground and while it is flying. Similarly, if desired, the aircraft cooling system 100 can be operated in the operating state shown in FIG. 10 both while the aircraft is flying and while it is on the ground. The electronic control unit 34 can, however, also control the aircraft cooling system such that it is operated as shown in FIG. 9 while the aircraft is on the ground, but as illustrated in FIG. 10 while the aircraft is flying. Finally, it is conceivable to control the aircraft cooling system 100 by means of the electronic control unit 34 such that it is operated as shown in FIG. 9 while the aircraft is flying, whereas it is operated as illustrated in FIG. 10 while the aircraft is on the ground.

The aircraft cooling system 100 illustrated in FIGS. 11 and 12 differs from the arrangement according to FIGS. 9 and 10 in that an opening 36 leading into the interior of the aircraft fuselage is arranged not in the region of the aircraft tail end 22, but in the region of a leading edge 40, facing away from the tail of the aircraft, of an aircraft rudder unit 42. In the operating state of the aircraft cooling system 100 illustrated in FIG. 11, the conveying device 32 is controlled by the electronic control unit 34 in such a way that air flows from the aircraft environment through the matrix body 12 of the cooler 10 from the first matrix body surface 18 in the direction of the second matrix body surface 20, i.e. from the outside inwards. The air discharge from the interior of the aircraft fuselage takes place in this operating state of the aircraft cooling system 100 through the opening 36, then acting as an air outlet, in the region of the leading edge 40 of the aircraft rudder unit 42.

In contrast to this, the opening 36 provided in the region of the leading edge 40 of the aircraft rudder unit 42 serves as an air inlet in the operating state of the cooling system 100 shown in FIG. 12. The air discharge from the interior of the aircraft fuselage takes place through the coolant channels 16 formed in the matrix body 12 of the cooler 10. In other words, the air flows through the matrix body 12 of the cooler 10 from the second matrix body surface 20 in the direction of the first matrix body surface 18, i.e. from the inside outwards.

The opening 36 provided in the region of the leading edge 40 of the aircraft rudder unit 42, which opening acts as an air outlet or as an air inlet depending on the operating state of the aircraft cooling system 100, is configured in the form of a scoop inlet and has a flow cross-section variable by means of a flap 35. The cooling air mass flow through the opening 36 can thus be adjusted as desired by the electronic control unit 34 by appropriate control of the flap position. Furthermore, the position of the flap 35 which adjusts the flow cross-section of the opening 36 provided in the region of the leading edge 40 of the aircraft rudder unit 42 can be controlled by the electronic control unit 34, while the aircraft is flying, such that the flap 35 causes a desired aerodynamic drag. The flap 35 can thus be used, if desired, as an additional air brake.

In principle, the aircraft cooling system 100 can be operated as illustrated in FIG. 11 or as shown in FIG. 12 both while the aircraft is flying and while it is on the ground. It is, however, also conceivable to operate the aircraft cooling system 100 in the operating state illustrated in FIG. 11 while the aircraft is on the ground and in the operating state shown in FIG. 12 while the aircraft is flying. Finally, it is possible to operate the aircraft cooling system 100 as shown in FIG. 11 while the aircraft is flying and as shown in FIG. 12 while the aircraft is on the ground.

Finally, FIGS. 13 to 16 illustrate a third embodiment of an aircraft cooling system 100. The aircraft cooling system 100 comprises two coolers 10 arranged adjacent to an aircraft tail plane 22 and shown in FIG. 6. In the operating state of the aircraft cooling system 100 illustrated in FIGS. 13 and 14, an electronic control unit 34 controls a conveying unit 32 of the cooling system 100 in such a way that air is sucked from the aircraft environment through the coolant channels 16 formed in the matrix body 12 of the coolers 10 into an interior of the aircraft fuselage. After flowing through the matrix body 12 of the coolers 10, the air is used for direct cooling of a heat-generating component on board the aircraft and finally is led via an opening 36 provided in the region of the aircraft tail end 22 back into the aircraft environment again. For this purpose, the electronic control unit 34 moves a flap (not illustrated in the figures) for defining the flow cross-section of the opening 36 into an open position.

Figure 15:
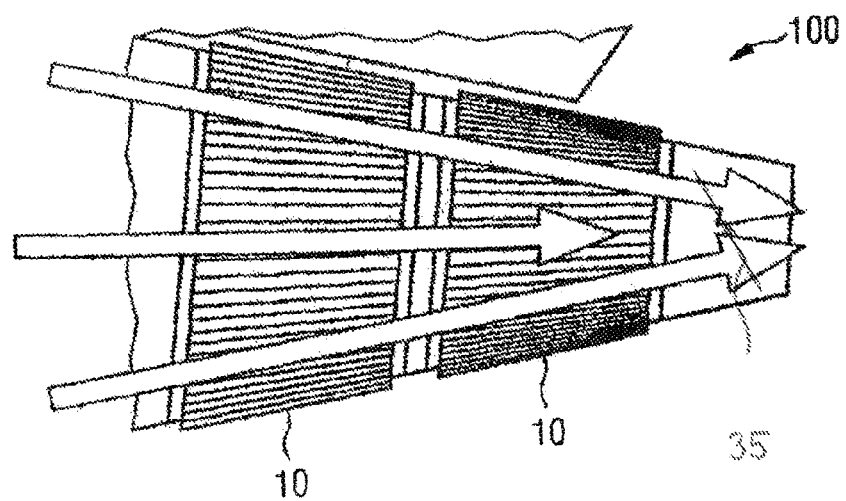
FIG. 15 shows the aircraft cooling system according to FIG. 13 operated in a second operating state.
Figure 16:
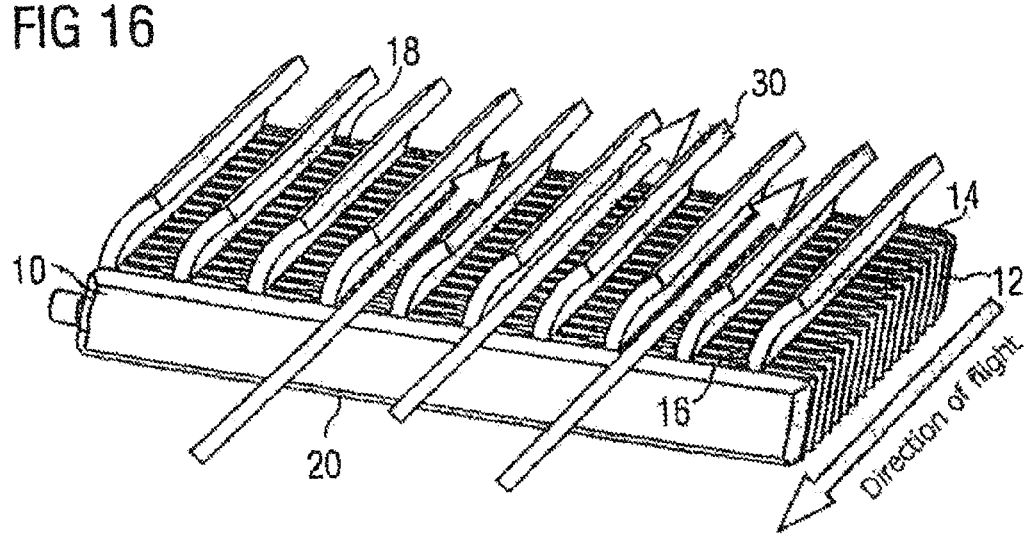
FIG. 16 shows a detail view of the aircraft cooling system according to FIG. 15.

In contrast to this, in the operating state of the aircraft cooling system 100 shown in FIGS. 15 and 16, the electronic control unit 34 switches off the conveying device 32. Furthermore, the electronic control unit 34 moves the flap, closing the opening 36, into a closed position. This has the effect that the ambient air flows over the first matrix body surface 18, forming an outer surface of the aircraft outer skin, but substantially no flow through the coolant channels 16 formed in the matrix body 12 of the coolers 10 takes place. The flow over the first matrix body surface 18 is controlled in each case by the ribs 30 extending from the first matrix body surface 18. Moreover, the ribs 30 protect the matrix body 12 of the coolers 10 from external influences.

Figure 13:
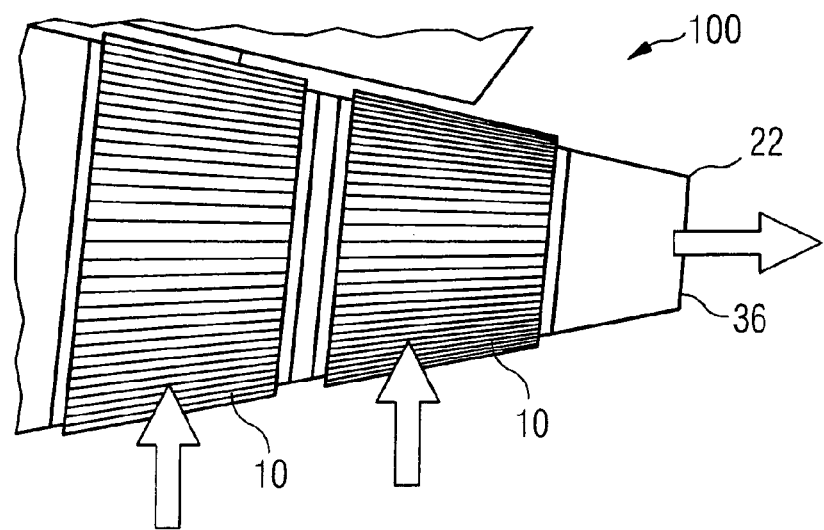
FIG. 13 shows a third embodiment of an aircraft cooling system operated in a first operating state.
Figure 14:
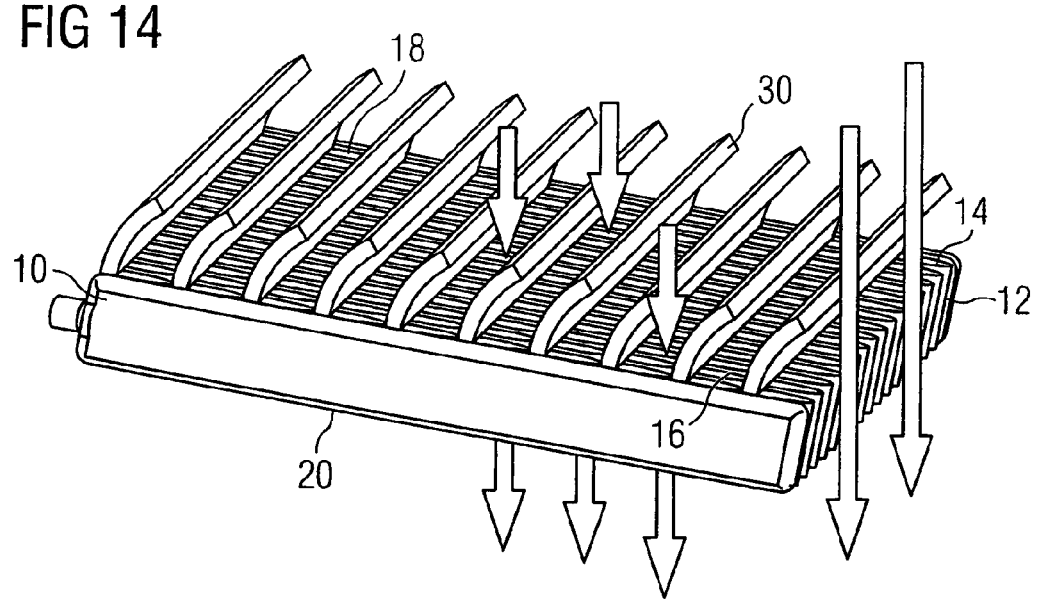
FIG. 14 shows a detail view of the aircraft cooling system according to FIG. 13.

The aircraft cooling system 100 shown in FIGS. 13 to 16 is operated in the operating state shown in FIGS. 13 and 14 while the aircraft is on the ground. By contrast, the aircraft cooling system 100 is operated in the flow-over mode shown in FIGS. 15 and 16 while the aircraft is flying.

The invention claimed is:

1. An aircraft cooling system comprising:
   a cooler having a matrix body in which a plurality of coolant channels are formed and extend from a first surface of the matrix body to a second surface of the matrix body, allowing a coolant to flow through the matrix body, the matrix body of the cooler forming a section of an aircraft outer skin with the first and second surfaces of the matrix body, in the state of the cooler mounted to an aircraft, forming outer and inner surfaces respectively of the aircraft outer skin, and
   a control unit to control the coolant flow through the coolant channels, at least in some operating phases of the aircraft cooling system, such that the coolant in the region of the first surface of the matrix body passes into the coolant channels, and in the region of the second surface of the matrix body passes out of the coolant channels, and to control the coolant flow through the coolant channels, at least in other operating phases of the aircraft cooling system, such that the coolant in the region of the second surface of the matrix body passes into the coolant channels, and in the region of the first surface of the matrix body passes out of the coolant channels.

2. An aircraft cooling system according to claim 1, characterised in that the first surface of the matrix body has a structure suitable for reducing the frictional drag of the first matrix body surface when air is flowing over the first matrix body surface while the aircraft is flying.

3. An aircraft cooling system according to claim 1, characterised in that the matrix body of the cooler is of multilayer construction in the direction of the coolant flow through the coolant channels formed in the matrix body.

4. An aircraft cooling system according to claim 1, characterised by the control unit to control, by appropriate control of the position of a flap defining a flow cross-section of an opening connecting the interior of the aircraft fuselage to the aircraft environment, at least one of a coolant volume flow flowing through the opening and aerodynamic drag caused by the flap while the aircraft is flying.

5. An aircraft cooling system according to claim 1, characterised in that the matrix body of the cooler comprises a plurality of lamellae delimiting the coolant channels formed in the matrix body.

6. A method according to claim 5, characterised in that, in the operating phases of the aircraft cooling system in which the coolant flows over the first matrix body surface, a conveying device which serves to convey, in operating phases of the aircraft cooling system in which the coolant flows through the matrix body of the cooler, coolant through the coolant channels formed in the matrix body of the cooler is switched off.

7. An aircraft cooling system according to claim 1, characterised in that the matrix body of the cooler is designed to form an aircraft outer skin section arranged in the region of a tail or a belly fairing of the aircraft.

8. An aircraft cooling system according to claim 7, characterised in that the matrix body of the cooler is designed to form at least one of a lower and an upper region of an aircraft outer skin section adjacent to a tail end of the aircraft.

9. An aircraft cooling system according to claim 1, characterised by a plurality of ribs extending from the first surface of the matrix body.

10. An aircraft cooling system according to claim 9, characterised in that the ribs at least one of extend substantially parallel to flow lines of an air flow flowing over the first surface of the matrix body while the aircraft is flying and have a contour curved in the direction of the first surface of the matrix body.

11. An aircraft cooling system according to claim 1, characterised in that an opening connecting an interior of an aircraft fuselage to the aircraft environment is designed to act, in the operating phases of the aircraft cooling system in which the coolant flows through the matrix body of the cooler from the second matrix body surface in the direction of the first matrix body surface, as a coolant inlet, through which the coolant can be withdrawn from the aircraft environment before flowing through the matrix body.

12. An aircraft cooling system according to claim 11, characterised in that the opening connecting the interior of the aircraft fuselage to the aircraft environment is arranged in at least one of the region of a tail end of the aircraft, the region of an edge, facing away from a tail of the aircraft, the region of an aircraft rudder unit and the region of a belly fairing of the aircraft.

13. An aircraft cooling system according to claim 1, characterised in that an opening connecting an interior of an aircraft fuselage to the aircraft environment is designed to act, in the operating phases of the aircraft cooling system in which the coolant flows through the matrix body of the cooler from the first matrix body surface in the direction of the second matrix body surface, as a coolant outlet, through which the coolant can be led back into the aircraft environment after flowing through the matrix body.

14. An aircraft cooling system according to claim 13, characterised in that the opening connecting the interior of the aircraft fuselage to the aircraft environment is arranged in a region of the aircraft outer skin on which, while the aircraft is flying, a lower pressure acts than on the aircraft outer skin section formed by the matrix body of the cooler.

15. An aircraft cooling system according to claim 13, characterised in that the opening connecting the interior of the aircraft fuselage to the aircraft environment is arranged in at least one of the region of a tail end of the aircraft, the region of an edge, facing away from a tail of the aircraft, of an aircraft rudder unit and the region of a belly fairing of the aircraft.

16. An aircraft cooling system according to claim 1, characterised by the control unit to control the coolant flow in such a way that, at least in certain operating phases of the aircraft cooling system, the coolant flows over the first surface of the matrix body.

17. An aircraft cooling system according to claim 16, characterised in that the control unit is designed to close, in the operating phases of the aircraft cooling system in which the coolant flows over the first matrix body surface, an opening connecting an interior of an aircraft fuselage to the aircraft environment and acting as a coolant outlet or as a coolant inlet in operating phases of the aircraft cooling system in which the coolant flows through the matrix body of the cooler.

18. An aircraft cooling system according to claim 16 characterised in that the control unit is designed to switch off, in the operating phases of the aircraft cooling system in which the coolant flows over the first matrix body surface, a conveying device which serves to convey, in operating phases of the aircraft cooling system in which the coolant flows through the matrix body of the cooler, coolant through the coolant channels formed in the matrix body of the cooler.

19. A method for operating an aircraft cooling system, wherein at least in certain operating phases of the aircraft cooling system, a coolant flows through a matrix body of a cooler, in which a plurality of coolant channels are formed and extend from a first surface of the matrix body to a second surface of the matrix body, and which forms a section of an aircraft outer skin with the first and second surfaces of the matrix body, in the state of the cooler mounted to an aircraft, forming outer and inner surfaces respectively of the aircraft outer skin, the method comprising:
controlling the coolant flow through the coolant channels at least in some operating phases of the aircraft cooling system, such that the coolant in the region of the first surface of the matrix body passes into the coolant channels, and in the region of the second surface of the matrix body passes out of the coolant channels, and
controlling the coolant flow through the coolant channels, at least in other operating phases of the aircraft cooling system, such that the coolant in the region of the second surface of the matrix body passes into the coolant channels, and in the region of the first surface of the matrix body passes out of the coolant channels.

20. A method according to claim 19, characterised in that the coolant flow is withdrawn from the aircraft environment, before flowing through the matrix body of the cooler, through an opening connecting an interior of an aircraft fuselage to the aircraft environment and acting as a coolant inlet.

21. A method according to claim 19, characterised in that, by appropriate control of the position of a flap defining a flow cross-section of an opening connecting the interior of the aircraft fuselage to the aircraft environment, at least one of a coolant volume flow flowing through the opening and an aerodynamic drag caused by the flap while the aircraft is flying is controlled.

22. A method according to claim 19, characterised in that the coolant flow, after flowing through the matrix body of the cooler, is led back into the aircraft environment through an opening connecting an interior of an aircraft fuselage to the aircraft environment and acting as a coolant outlet.

23. A method according to claim 22, characterised in that a lower pressure acts on the opening connecting the interior of the aircraft fuselage to the aircraft environment and acting as a coolant outlet, while the aircraft is flying, than on the aircraft outer skin section formed by the matrix body of the cooler.

24. A method according to claim 19, characterised in that, at least in certain operating phases of the aircraft cooling system, the coolant flows over the first surface of the matrix body.

25. A method according to claim 24, characterised in that, in the operating phases of the aircraft cooling system in which the coolant flows over the first matrix body surface, an opening connecting an interior of an aircraft fuselage to the aircraft environment and acting as a coolant outlet or as a coolant inlet in operating phases of the aircraft cooling system in which the coolant flows through the matrix body of the cooler is closed.

26. A method according to claim 24, characterised in that, in the operating phases of the aircraft cooling system in which the coolant flows over the first matrix body surface, the coolant flow over the first matrix body surface is controlled by a plurality of ribs extending from the first matrix body surface.

* * * * *